United States Patent
Markhovsky et al.

(10) Patent No.: US 9,411,516 B2
(45) Date of Patent: Aug. 9, 2016

(54) STORAGE CONTROLLER CONFIGURED TO TRANSFER DATA STORED BY FIRST STORAGE DEVICE TO SECOND STORAGE DEVICE DURING A PERIOD OF INACTIVITY BASED AT LEAST ON WRITE SPEEDS

(71) Applicant: SEAGATE TECHNOLOGY LLC, Cupertino, CA (US)

(72) Inventors: Felix Markhovsky, Saratoga, CA (US); Michael Lee, Palo Alto, CA (US); Michael Gene Morgan, Los Altos Hills, CA (US)

(73) Assignee: Seagate Technology LLC, Cupertino, CA (US)

( * ) Notice: Subject to any disclaimer, the term of this patent is extended or adjusted under 35 U.S.C. 154(b) by 70 days.

(21) Appl. No.: 14/303,050

(22) Filed: Jun. 12, 2014

(65) Prior Publication Data

US 2015/0363111 A1    Dec. 17, 2015

(51) Int. Cl.
*G06F 3/00* (2006.01)
*G06F 3/06* (2006.01)

(52) U.S. Cl.
CPC ............ *G06F 3/0607* (2013.01); *G06F 3/0643* (2013.01); *G06F 3/0647* (2013.01); *G06F 3/0658* (2013.01); *G06F 3/0685* (2013.01); *G06F 2003/0692* (2013.01)

(58) Field of Classification Search
CPC ... G06F 3/0658; G06F 3/0685; G06F 3/0692; G06F 3/0607
USPC ......................................... 710/6–10; 711/103
See application file for complete search history.

(56) References Cited

U.S. PATENT DOCUMENTS

| | | | |
|---|---|---|---|
| 6,785,767 B2 * | 8/2004 | Coulson | G06F 3/0613 711/103 |
| 7,411,757 B2 | 8/2008 | Chu et al. | |
| 7,840,753 B1 | 11/2010 | Booth | |
| 8,122,164 B2 * | 2/2012 | Yokomizo | G06F 13/28 710/22 |
| 9,256,567 B2 * | 2/2016 | Morgan | G06F 13/4068 |
| 2010/0138580 A1 * | 6/2010 | Asfur | G06F 13/385 710/301 |
| 2012/0275046 A1 | 11/2012 | Ehrlich | |
| 2013/0242425 A1 | 9/2013 | Zayas et al. | |

* cited by examiner

*Primary Examiner* — Tammara Peyton (57) ABSTRACT

Provided is an apparatus including a first storage device having a first write speed and a second storage device having a second write speed. The apparatus also includes a controller configured to manage a transfer of data to the first storage device or the second storage device. The amount of data stored on each of the first and second storage devices is based on the first write speed and the second write speed.

19 Claims, 5 Drawing Sheets

STORAGE CONTROLLER CONFIGURED TO TRANSFER DATA STORED BY FIRST STORAGE DEVICE TO SECOND STORAGE DEVICE DURING A PERIOD OF INACTIVITY BASED AT LEAST ON WRITE SPEEDS

BACKGROUND

External storage devices may be portable peripheral devices that provide storage capacity to augment the data storage internal to a host computing device, such as for backing up data in case of an internal hard drive failure or to provide additional storage capacity. Generally, external storage devices, have fixed capabilities, such as storage capacity. For instance, an external storage device may include a hard disk drive (HDD) placed inside a fixed enclosure. As a consequence, the external storage device may be replaced in order to obtain improved capabilities or functionality.

SUMMARY

Provided is an apparatus including a first storage device having a first write speed and a second storage device having a second write speed. The apparatus also includes a controller configured to manage a transfer of data to the first storage device or the second storage device. The amount of data stored on each of the first and second storage devices is based on the first write speed and the second write speed.

These and other features and aspects may be better understood with reference to the following drawings, description, and appended claims.

DESCRIPTION

Before various embodiments are described in greater detail, it should be understood by persons having ordinary skill in the art that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood by persons having ordinary skill in the art that the terminology used herein is for the purpose of describing the certain concepts, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Unless defined otherwise, all technical and scientific terms used herein have the same meaning as commonly understood by persons of ordinary skill in the art to which the embodiments pertain.

Provided herein are embodiments that provide for adding functionality to expand the capabilities of external storage devices, such as for example an external hard disk drive (HDD). A modular storage system may be upgraded to provide capabilities for external storage devices to transfer data to a host computing device through one or more interfaces, such as for example, universal serial bus (USB) 3.0 or THUNDERBOLT 2. In particular embodiments, the external storage device may receive a module that includes a module storage device and a controller that is configured to move data between the additional storage and the relatively slower HDD storage, as well as between a host computing device and these two storage devices, thereby enabling high speed performance for read-write transactions.

In particular embodiments, the controller of the module may be configured to handle asymmetry in read or write speed between storage devices in the external storage device by optimizing read or write operations of the HDD and the module storage device in tandem. The controller may enable data throughput at data rates that effectively aggregate the data rates of each the HDD and module storage device through movement of data between the module storage device and the HDD at high rates, for example up to 1400 MB/s (megabytes per second). For example, files temporarily stored on the module storage device may be transferred to the HDD and certain files stored on the HDD may be copied to a read cache of the module storage device during idle time. In particular embodiments, the cache controller of the expansion module may be configured to operate independently of the OS or drivers of the host computing device.

Figure 1:
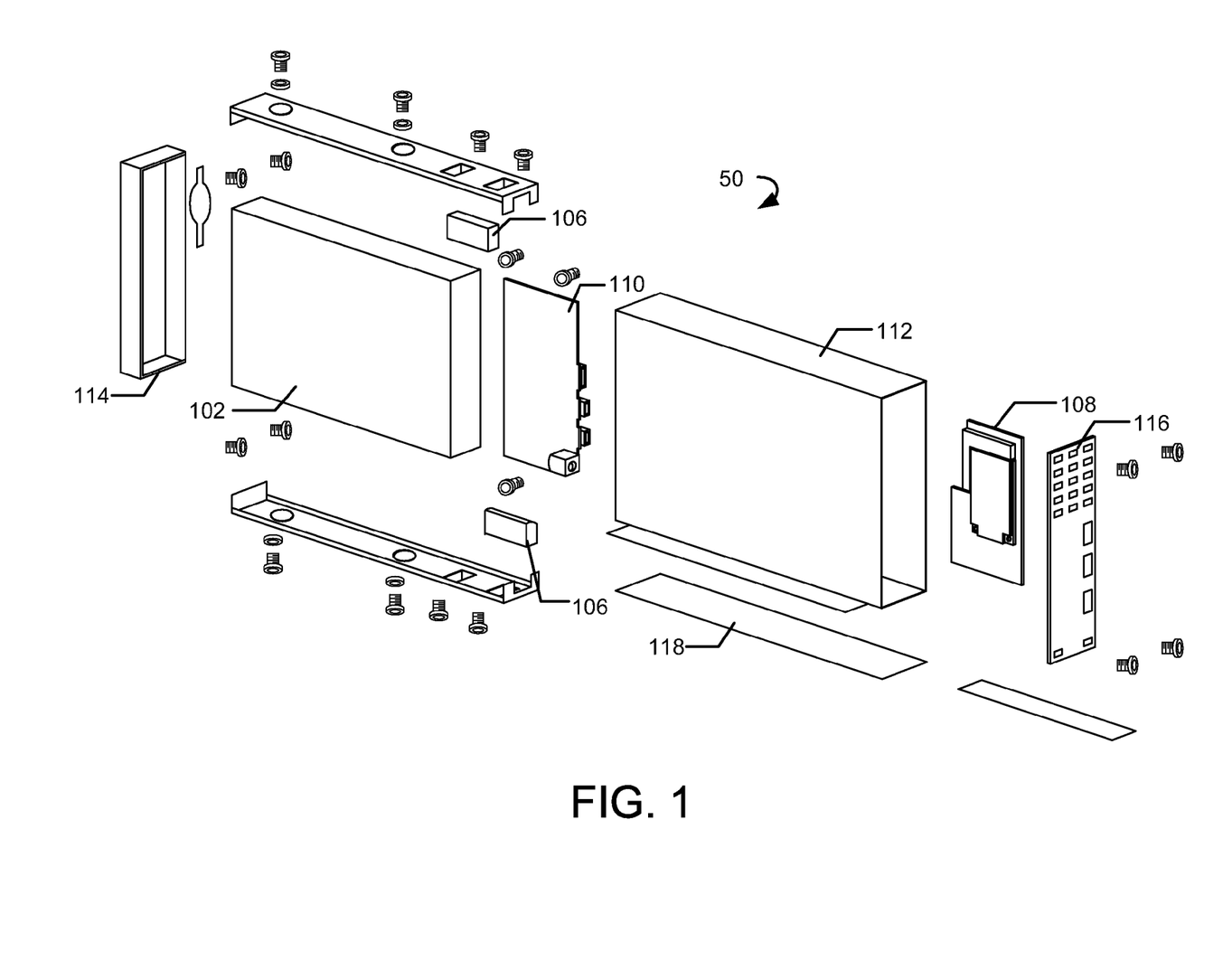
FIG. 1 illustrates an example external storage system, according to one aspect of the present description.

FIG. 1 illustrates an example external storage system, according to one aspect of the present description. An external storage system 50 may include a front panel 114, rear panel 116, and pedestal 118, as illustrated in the example of FIG. 1. Front panel 114 may include a switch (e.g. button) to power on external storage system 50. Rear panel 116 is configured to provide access to one or more ports of interface card 110 that each support a particular data bus interface. Rear panel 116 may be removable to facilitate insertion or removal of a module 108, also may be referred to as an expansion module, as described below. In particular embodiments, a modular storage system, that includes a storage device 102, interface card 110, and one or more guide rails 106 attached to a chassis of modular storage system 100, may be enclosed in an enclosure 112 as part of an external storage system 50.

In particular embodiments, external storage system 50 may be coupled to a host computing device to provide additional storage or back-up storage of data for the host computing device. As described below, external storage system 50 may be coupled to the host computing device through a cable that couples to one of the ports on interface card 110. As an example, the host computing device may be coupled to external storage system 50 through a USB cable. In addition, external storage system 50 may include module 108 that has a module storage device and cache controller, as described below.

Figure 2:
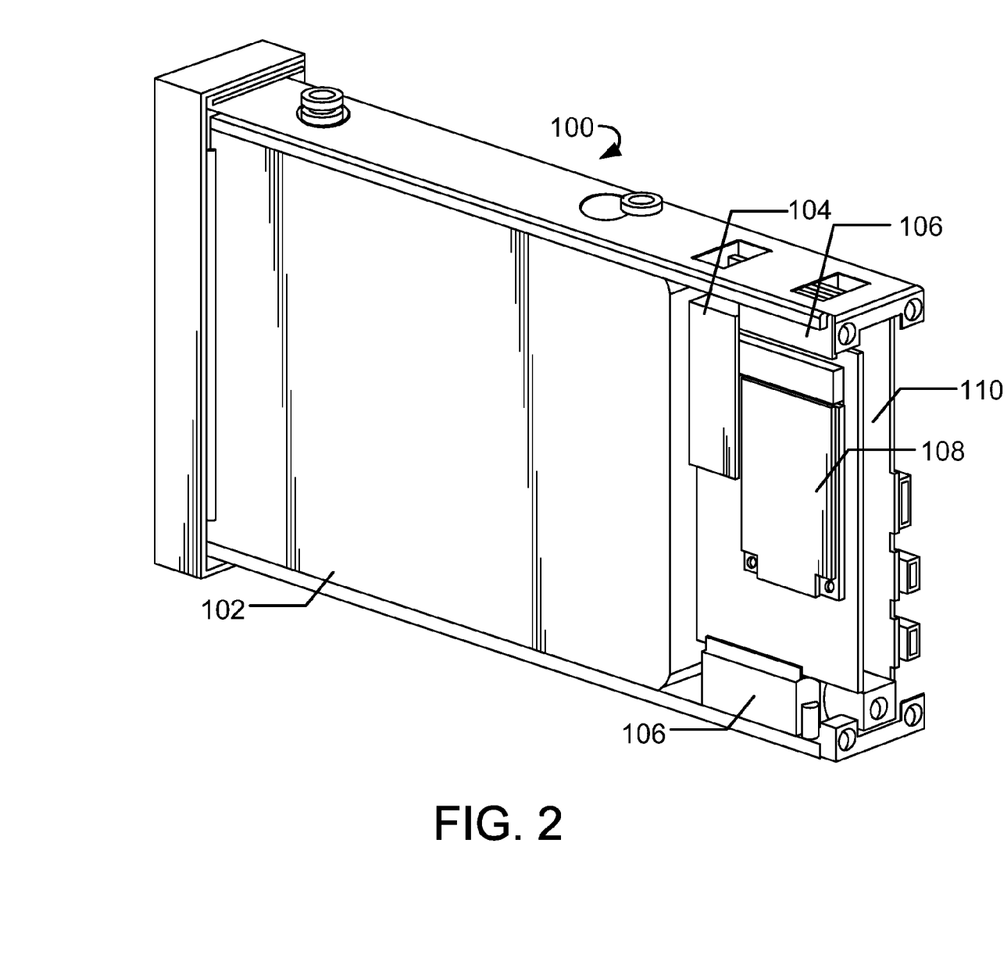
FIG. 2 illustrates an example modular storage system, according to one aspect of the present description.

FIG. 2 illustrates an example modular storage system, according to one aspect of the present description. As illustrated in the example of FIG. 2, modular storage system 100 may include, but is not limited to, a storage device 102, connector 104, interface card 110, and one or more guide rails 106 attached to a chassis of modular storage system 100. In particular embodiments, connector 104 may be a PCIe edge connector or slot. Guide rails 106 and connector 104 may form an expansion slot for removably coupling module 108 to storage device 102. For example, traces of the expansion module may mate with the corresponding portion of connector 104. Storage device 102 may be a HDD, solid-state drive (SSD), tape drive, optical drive, or any suitable data storage device. As an example, storage device 102 may be a 3.5" HDD. In particular embodiments, modular storage system 100 may be coupled to the host computing device (not shown) using a data bus interface (e.g. small computer system interface (SCSI), USB 2.0 or 3.0, IEEE 1394 ("FIREWIRE"), serial ATA (SATA), or THUNDERBOLT) through interface card 110.

As illustrated in the example of FIG. 2, a lower guide rail 106 may be configured as part of an expansion slot to hold module 108 in the pre-determined position. Module 108 is positioned by guide rails 106, such that module 108 is electrically coupled to storage device 102 of modular storage system 100 through connector 104 of interface card 110. As described above, ports of interface card 110 may support one or more data bus interfaces (e.g. small computer system interface (SCSI), USB 2.0 or 3.0, IEEE 1394 ("FIREWIRE"), serial ATA (SATA), or THUNDERBOLT. As described below, module 108 may be a printed-circuit board assembly (PCBA). Additional storage capacity can be provided to the host computing device by "daisy chaining" additional modular storage systems 100 or other external storage devices. In addition, module 108 may be removed from modular storage system 100 and placed into modular storage system 100 with a different configuration (e.g., different capacity storage device 102 or storage device 102 from a different manufacturer) without loss of functionality. Example host computing devices may include a desktop computer, laptop computer, tablet computer, set-top box, smart TV, digital media player, or any suitable computing device.

In particular embodiments, module 108 may provide one or more pre-determined capabilities or functionalities to augment storage device 102. As described below, the data transfer rate between the host computing device and storage device 102 may be limited by the read and write speed of storage device 102. In particular embodiments, module 108 may include a module storage device, such as for example a high-speed SSD, as described below. For example, module 108 with a SSD and controller may provide a data transfer rate between the host computing device and the SSD of module 108 that is higher than the data transfer rate between the host computing device and storage device 102.

Figure 3:
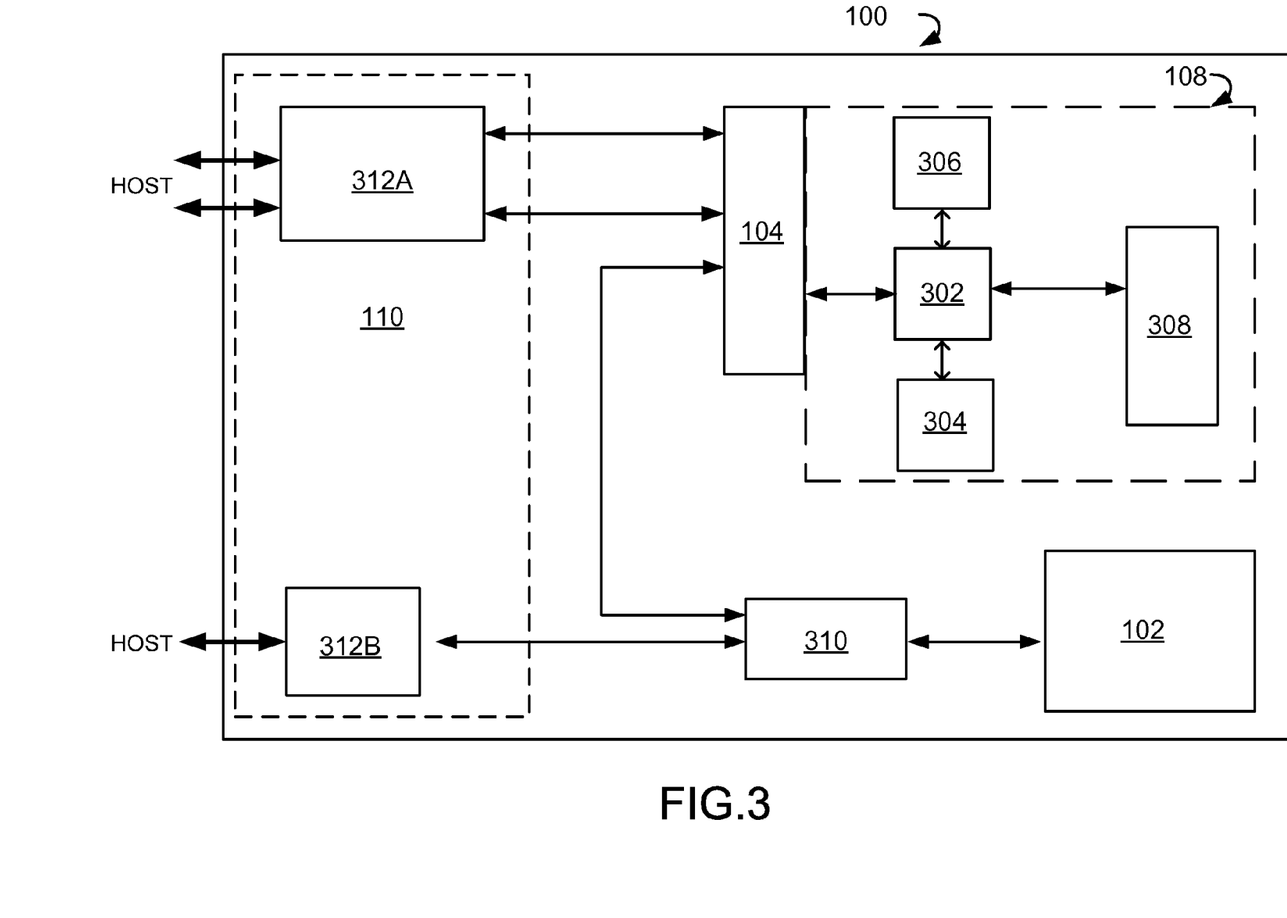
FIG. 3 illustrates an example schematic of a module for the external storage system, according to one aspect of the present description.

FIG. 3 illustrates an example schematic of a module for the external storage system, according to one aspect of the present description. Although this disclosure describes and illustrates particular modules for an external storage system having a particular configuration of particular components, this disclosure contemplates any suitable module for the external storage system having any suitable configuration of any suitable components. Module 108 may include controller 302, module storage device 308, and one or more data buses coupling controller 302 to connector 104 or module storage device 308. In particular embodiments, controller 302 may be implemented through an embedded processor and may be separate from the storage device 102 or module storage device 308. In particular embodiments, controller 302 may be coupled to one or more memory circuits 304 and 306, such as volatile, non-volatile, or any combination thereof. For example, memory circuit 304 may be a dynamic random-access memory (DRAM) and memory circuit 306 may be a flash memory. As described below, memory circuit 304 may function as a write buffer that is configured to temporarily store data being written to either storage device 102 or module storage device 308. As an example, memory circuit 304 may accommodate write speed variations while data being written to either storage device 102 or module storage device 308. In addition, controller 302 may be coupled to a module storage device 308 that is configured as a read/write cache memory for module 108. For example, module storage device 308 may be a SSD, such as for example a M.2 SSD.

In particular embodiments, interface card 110 may be a PCBA configured to interface through one or more data connections to the host computing device using one or more data bus interfaces. In particular embodiments, interface card 110 may include one or more bridge circuits 312A-B configured to connect devices with differing data bus interfaces (e.g. PCIe to SATA). For example, bridge circuit 312A may be configured to convert data transmitted using a THUNDERBOLT 2 data bus interface to a PCIe data bus interface, whilst bridge circuit 312B may be configured to convert data transmitted using a USB 3.0 data bus interface to a SATA data bus interface.

The host computing device may be coupled to a data bus interface, such as USB 3.0, through bridge circuit 312B. In particular embodiments, modular storage system 100 may also include a data-multiplexer (MUX) circuit 310. Data-MUX circuit 310 may be configured to selectively read/write data from the host computing device either through module 108 or bridge circuit 312B to storage device 102. As an example, when host computing device is writing data to storage device 102 through bridge circuit 312B, data-MUX circuit 310 may couple storage device 102 to bridge circuit 312B. In particular embodiments, modular storage system 100 may include an arbitration logic circuit (not shown) that is coupled to data-MUX circuit 310. The arbitration-logic circuit may be configured to determine whether the host computing device is accessing storage device 102 through either the data bus interface supported by bridge circuit 312A (e.g. THUNDERBOLT 2.0) or the data bus interface supported by bridge circuit 312B (e.g. USB 3.0). As an example, the arbitration-logic circuit may determine host computing device is reading data from storage device 102 through a USB 3.0 data bus interface supported by bridge circuit 312B and configure data-MUX circuit 310 to couple storage device 102 to bridge circuit 312B. As another example, the arbitration logic circuit may subsequently determine host computing device is writing data to storage device 102 through the THUNDERBOLT 2.0 data bus interface supported by bridge circuit 312A and configure data-MUX circuit 210 to couple storage device 102 to bridge circuit 312A.

As described above, controller 302 of module 108 may be coupled to the host computing device through one or more data bus interfaces, such as for example USB 3.0, SATA, or THUNDERBOLT 2 data interfaces. In particular embodiments, controller 302 may be coupled to module storage device 308 through a peripheral component interface express (PCIe) Gen 2 or 3 data interface. As described below, data transfers between storage device 102 of modular storage system 100 and module storage device 308 may be performed through controller 302.

Data from the host computing device received at interface card 110 may be transmitted to module 108. For example, data may be transferred between bridge circuit 312A and module 108 through connector 104 using a particular data bus interface, such as for example PCIe. As an example, bridge circuit 312A may be coupled to module 108 through a four lane (x4) PCIe data bus. In particular embodiments, controller 302 is configured to direct data between the host computing device, module storage device 308, and storage device 102 through the data buses. As described below, controller 302 may be configured to couple the host computing device to module storage device 308, module storage device 308 to storage device 102, or storage device 102 to the host computing device. Communication between module 108 and storage device 102 may be performed through a SATA data bus using controller 302. As another example, a four lane (x4) PCIe-Gen 2 data bus may couple controller 302 to module storage device 308.

As described above, additional functionality may be implemented on external storage system 50 by inserting module 108. Use of data bus interfaces that support high data rate transfers (e.g. THUNDERBOLT 2.0) may provide opportunities for accelerating data transfers between the host computing device and external storage system 50. For example, THUNDERBOLT 2.0 may support data rates of 1300-1400 MB/s. Module storage device 308 may have a higher read or write data rate than storage device 102. As an example, storage device 102 may be a 3.5" HDD with a read/write data rate in the range of approximately 200-400 MB/s and module storage device 308 may be a M.2 SDD with a read/write data rate in the range of approximately 1000-1300 MB/s. In particular embodiments, controller 302 of module 108 may be configured to manage the operation of the module storage device 308 in a fashion that is transparent to the host computing device. In other words, controller 302 may manage whether data is stored on storage device 102, module storage device 308, or any combination thereof. Although this disclosure illustrates and describes data transfers between a host computing device and a particular number of storage devices, this disclosure contemplates data transfers between the host computing device and any suitable number of storage devices that support differing data transfer rates. In particular embodiments, controller 302 manages the data stored on in memory circuit 304 during write operations. As an example, controller 302 may fragment a file into multiple portions and write some portions of the file on module storage device 308 and the remaining portions of the file to storage device 102. The ratio of a file that is stored on module storage device 308 to the amount of the file stored on storage device 102 may be based at least in part on the write speed of module storage device 308 relative to the write speed of storage device 102. For example, if module storage device has a write speed 4× faster than storage device 102, approximately 80% of a file may be stored on module storage system 308 and approximately 20% stored on storage device 102. The ratio of the file stored on module storage device 308 and storage device 102 may also depend on the specifics of the fragmentation of the file.

In particular embodiments, at least a portion of the data transferred between the host computing device and storage device 102 is stored at least temporarily by module storage device 308 configured to operate as a cache memory. In particular embodiments, data written to external storage system 50 from the host computing device resides on storage device 102 and the storage capacity of module storage device 308 may be used as a temporary cache for data. As described below, a file from the host computing device may be first written to module storage device 308 for temporary storage at a higher data rate (e.g. 1200 MB/s) than storage device 102 is able to support. Data corresponding to the file may be written from module storage device 308 to storage device 102 concurrently with data being written to module storage device 308, thereby utilizing the differing data throughputs of module storage device 308 and storage device 102. For example, for a 3.5" HDD with a read/write data rate in the range of approximately 200-400 MB/s and module storage device 308 may be a M.2 SDD with a read/write data rate in the range of approximately 1000-1300 MB/s, the aggregated data throughput of writing data to both module storage device 308 and storage device 102 may be 1400-1600 MB/s. In other words, the aggregated data throughput of writing data is higher than the write speed of either module storage device 308 or storage device 102. Although this disclosure describes a particular configuration of particular components having particular data rates, this disclosure contemplates any suitable using any suitable configuration of components, where one component has a higher data rate than the other. Moreover, although this disclosure describes reading/writing of data through particular caching operations using a particular configuration of particular components, this disclosure contemplates any suitable data access operations (e.g. reading or writing) through any suitable caching operations using any suitable configuration of any suitable components.

As described above, files transmitted by the host computing device to external storage system 50 may be fragmented and different portions of the files stored in either storage system 102 or module storage device 308. In particular embodiments, the fragmented file may be accessed by the host computing device by accessing the portion stored on storage device 102 and the portion stored on module storage device 308. As an example, controller 302 may be configured to track the location of each portion of the file and manage accessing each portion so that the file may be accessed by the host computing device. As described below, controller 302 may maintain a list or pointers where on storage device 102, module storage device 308, or a combination thereof, the different portions of files are located.

In particular embodiments, controller 302 may maintain one or more lists of files stored on external storage system 50 through storage device 102, module storage device 308, or any combination thereof. As an example, the list of files may include information corresponding to an identifier of the file (e.g., filename), file size, time stamp, information identifying whether the corresponding file is stored or cached on module storage device 308, or information identifying whether the corresponding file is stored on storage device 102. In particular embodiments, the list of files may be sorted in order in which each file was mostly recently accessed. As another example, the files may include a list of files that are partially stored on both storage device 102 and module storage device 308.

In particular embodiments, data transmitted by the host computing device to storage device 102 may be initially written to module storage device 308 at data rates compatible with module storage device 308 (e.g. 1000-1300 MB/s). Furthermore, data above the storage capacity of a write buffer of module storage device 308 may be written to storage device 102 at data rates (e.g. 200-400 MB/s) compatible with storage device 102. In particular embodiments, data is written to storage device 102 and module storage device 308 at an aggregated data rate that is based on the write speeds of the individual storage devices (e.g., storage device 102 and module storage device 308). As an example, the aggregate data may be in the range of 1400-1600 MB/s based on data rates compatible with module storage device 308 (e.g. 1000-1300 MB/s) and storage device 102 (e.g. 200-400 MB/s). The list of files may be updated concurrently to include the file being written to external storage system 50. Data stored on module storage device 308 is subsequently written to storage device 102.

In particular embodiments, a portion of module storage device 308 may be reserved or over-provisioned to enable consistent write latency over time. Furthermore, the amount of reserved memory in module storage device 308 may be programmable through firmware/software of controller 302. In particular embodiments, controller 302 may free storage space of module storage device 308 by removing data corresponding to one or more files upon completion of the write operation. For example, controller 302 may traverse a list of files stored on module storage device 308 and erasing data corresponding to one or more files based on the time each file was previously accessed (e.g., longest time since last access or infrequently accessed). Furthermore, controller 302 may discontinue erasing files from module storage device once a pre-determined amount of storage is free. For example, the pre-determined amount of storage may be based at least in part on a file size of recently accessed files to be stored on module storage device 308 or the amount of reserved memory. In particular embodiments, controller 302 may assume that recently written files have a high probability of being accessed and may modify the list of files to include recently written files. Although this disclosure describes storing or retrieving files based on particular file characteristics (e.g., file access time), this disclosure contemplates storing or retrieving files based on any suitable characteristics.

In particular embodiments, module storage device 308 may cache one or more files for subsequent access by the host computing device. For example, one or more files that are most recently accessed by the host computing device may be cached on module storage device 308. The number of files cached on module storage device 308 may be based at least in part on an amount of memory of module storage device 308 reserved as a read cache. In response to a read request from the host computing device, controller 302 may traverse the list of files stored on module storage device 302. Data corresponding to the requested file is transmitted from module storage device 308 to the host computing device in response to determining the requested file is cached on module storage device 308. Controller 302 accesses storage device 102 for requested files not cached on module storage device 308. Furthermore, controller 302 may modify the information of the list of files to move the requested file to the top of the list. In particular embodiments, controller 302 may traverse the list of files cached in module storage device 308 and erase data corresponding to files stored on module storage device 308 with the most amount of time since the last access by the host computing device. The erasure of data from module storage device 308 may stop once sufficient space is free to store the accessed file on module storage device 308. The list of files stored on module storage device is modified to reflect changes from the files deleted and added to module storage device 308.

Figure 4:
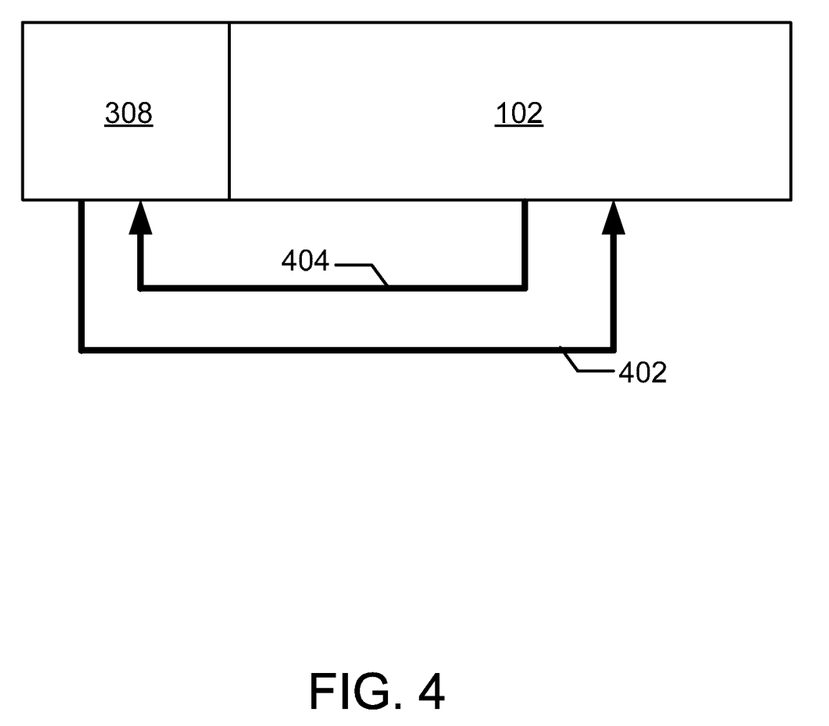
FIG. 4 illustrates a schematic of an example synchronization mode for the external storage system, according to one aspect of the present description.

FIG. 4 illustrates a schematic of an example synchronization mode for the external storage system, according to one aspect of the present description. In particular embodiments, controller 302 may execute a synchronization of files stored in storage device 102 and module storage device 308 whilst external storage system is idle (e.g., not performing either read or write operations). As illustrated by 402 in the example of FIG. 4, files stored in module storage device 308 are copied over to storage device 102. Coping files stored in module storage device 308 to storage device 102 may ensure a host computer is able to access all files from storage device 102 even if the host computing device does not support the data interface protocol used by module 108 (e.g. THUNDERBOLT 2). In particular embodiments, controller 302 modifies the list of files stored on module storage device 308 and storage device 102 to reflect the copying of files. As illustrated by 404 in the example of FIG. 4, files that more frequently accessed by the host computing device may be cached on module storage device 308 by copying these files from storage device 102 to module storage device 308.

Figure 5:
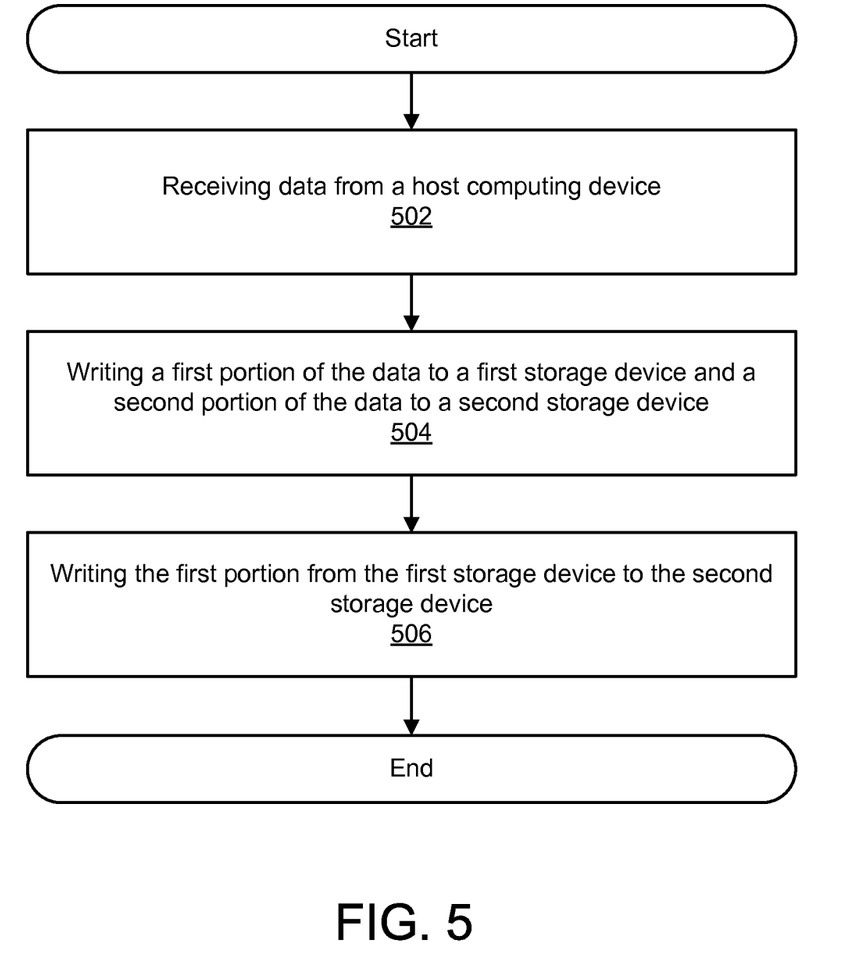
FIG. 5 illustrates an exemplary flow diagram for writing data to a storage device, according to one aspect of the present description.

FIG. 5 illustrates an example flow diagram for writing data to a storage device, according to one aspect of the present description. At block 502, a controller receives data corresponding to a file from a host computing device. In particular embodiments, the host computing device may be coupled to the external storage device through one or more data interfaces. For example, the host computing device may be coupled to the external storage system through a USB 3.0 data interface and a THUNDERBOLT 2 data interface.

At block 504, the controller writes a first portion of the data to a first storage device and a second portion of the data to a second storage device. For example, the external storage system may include a SSD and a 3.5" HDD. In particular embodiments, the relative amount of data of the first portion and of the second portion is based on a write speed of the first storage device relative to a write speed of the second storage device. For example, the write speed of a SSD may be 4 times faster than the write speed of a 3.5" HDD, such that approximately 80% of the data of the file may be stored on the SSD and 20% of the data of the file stored on the HDD.

At block 506, the controller writes the first portion from the first storage device to the second storage device during a period of inactivity between a controller and the host computing device. In particular embodiments, the controller operates in a synchronization mode during a period of inactivity where the controller is neither reading nor writing data to either the first or second storage devices. The synchronization mode is described above in the example of FIG. 4 and results in files transmitted by the host computing device being eventually stored on the second storage device.

Provided herein is a computer-readable non-transitory storage medium embodying logic that is configured when executed to receive a file from a host computing device. For example, in FIG. 3, the host computing device may be coupled to the external storage device through one or more data interfaces. For example, the host computing device may be coupled to the external storage system through a USB 3.0 data interface and a THUNDERBOLT 2 data interface. The logic is further configured to write a first portion of the file to a first storage device. As described above, the first storage device may be a SSD and data may be written at data rates consistent with the SSD (e.g., approximately 1200 MB/s). The logic is further configured to write a second portion of the file to a second storage device based on a storage capacity of a write buffer of the first storage device. As described in the example of FIG. 3, the second storage device may be a HDD and data may be written on the SSD up to a point where amount of data in the write buffer of the SSD is exceeded, when data is then written on the HDD. The logic is further configured to write the first portion from the first storage device to the second storage device during a period of inactivity between a controller and the host computing device. Writing of data from the SSD to the HDD may be part of a synchronization mode described above in the example of FIG. 4 and may result in files transmitted by the host computing device being eventually stored on the HDD.

Also provided herein is an apparatus that includes a first storage device having a first write speed and a second storage device having a second write speed. As described in the example of FIG. 2, the first storage device is SSD and the second storage device is a HDD. As an example the SSD may have a write speed of approximately 1200 MB/s and the HDD may have a write speed of approximately 240 MB/s. The apparatus also includes a controller configured to manage a transfer of data from a host computing device to the first storage device or the second storage device. In particular embodiments, the amount of data stored on each of the first and second storage devices is based on the first write speed and the second write speed. In particular embodiments, the controller is further configured to transfer data stored the first storage device to the second storage device during a period of inactivity between the controller and the host computing device. The controller may also be configured to transfer data from the second storage device to the first storage device based on a most recent access time of a plurality stored files. In particular embodiments, the controller is further configured to access a plurality of pointers to retrieve a file stored on the first and second storage devices.

While the embodiments have been described and/or illustrated by means of particular examples, and while these embodiments and/or examples have been described in considerable detail, it is not the intention of the Applicant to restrict or in any way limit the scope of the embodiments to such detail. Additional adaptations and/or modifications of the embodiments may readily appear to persons having ordinary skill in the art to which the embodiments pertain, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A method comprising:
  receiving data corresponding to a file from a host computing device;
  writing a first portion of the data to a first storage device and a second portion of the data to a second storage device based on a write speed of the first storage device relative to a write speed of the second storage device; and
  writing the first portion from the first storage device to the second storage device during a period of inactivity between a controller associated with the first storage device and the host computing device.

2. The method of claim 1, wherein the first storage device is a solid-state drive (SSD) having a first write speed and the second storage device is a hard-disk drive (HDD) having a second write speed, wherein the first write speed is higher than the second write speed, and wherein a relative amount of data of the first portion and the second portion is based on the write speed of the first storage device relative to the write speed of the second storage device.

3. The method of claim 1, further comprising tracking a location of the first portion stored on the first storage device and a location of the second portion on the second storage device.

4. The method of claim 1, further comprising:
  determining a most recent access time for a plurality of stored files on the first storage device; and
  writing the second portion from the second storage device to the first storage device based on the most recent access time of the stored files.

5. The method of claim 4, further comprising erasing data corresponding to one or more files stored on the first storage device based on the most recent access time of the stored files.

6. The method of claim 4, further comprising:
  maintaining a list of the stored files; and
  sorting the list is sorted by the most recent access time of each of the stored files.

7. The method of claim 1, wherein the list comprises an identifier of the file, size of the file, time stamp, or any combination thereof.

8. The method of claim 1, wherein the data is written on the first and second storage devices at an aggregated data rate that faster than the write speed of the first or second storage devices.

9. The method of claim 1, wherein the controller is removably coupled to the second storage device.

10. A computer-readable non-transitory storage medium embodying software that is configured when executed to:
  receive a file from a host computing device;
  write a first portion of the file to a first storage device; and
  write a second portion of the file to a second storage device based on a storage capacity of a write buffer of the first storage device, wherein the file is written on the first and second storage devices at a data rate that is based at least in part on a write speed of the first storage device and a write speed of the second storage device; and
  write the first portion from the first storage device to the second storage device during a period of inactivity between a controller and the host computing device.

11. The medium of claim 10, wherein the software is further configured to track a location of the first and second portions of the file.

12. The medium of claim 10, wherein the first storage device is a solid-state drive (SSD) having a first write speed and the second storage device is a hard-disk drive (HDD) having a second write speed, wherein the first write speed is higher than the second write speed.

13. The medium of claim 12, wherein an amount of data of the first portion relative to an amount of data of the second portion is approximately based on the first write speed relative to the second write speed.

14. The medium of claim 10, wherein the software is further configured to:
  determine a most recent access time for a plurality of stored files on the first storage device; and
  write the second portion from the second storage device to the first storage device based on the most recent access time of the stored files.

15. The medium of claim 14, wherein the software is further configured to erase one or more files stored on the first storage device based on the most recent access time of the stored files.

16. An apparatus comprising:
  a first storage device having a first write speed and a second storage device having a second write speed; and
  a controller configured to manage a transfer of data to the first storage device or the second storage device, wherein the controller is further configured to transfer data stored by the first storage device to the second storage device during a period of inactivity between the controller and a host computing device, the amount of data stored on each of the first and second storage devices is based on the first write speed and the second write speed, and the transfer of data is at an data rate that is based at least in part on the first and second write speeds.

17. The apparatus of claim 16, wherein the first storage device is a solid-state drive (SSD) having a first write speed and the second storage device is a hard-disk drive (HDD), wherein the first write speed is higher than the second write speed.

18. The apparatus of claim 16, wherein the controller is further configured to transfer data from the second storage device to the first storage device based on a most recent access time of a plurality stored files.

19. The apparatus of claim 16, wherein the controller is further configured to access a plurality of pointers to retrieve a file stored on the first and second storage devices.

* * * * *